UNITED STATES PATENT OFFICE.

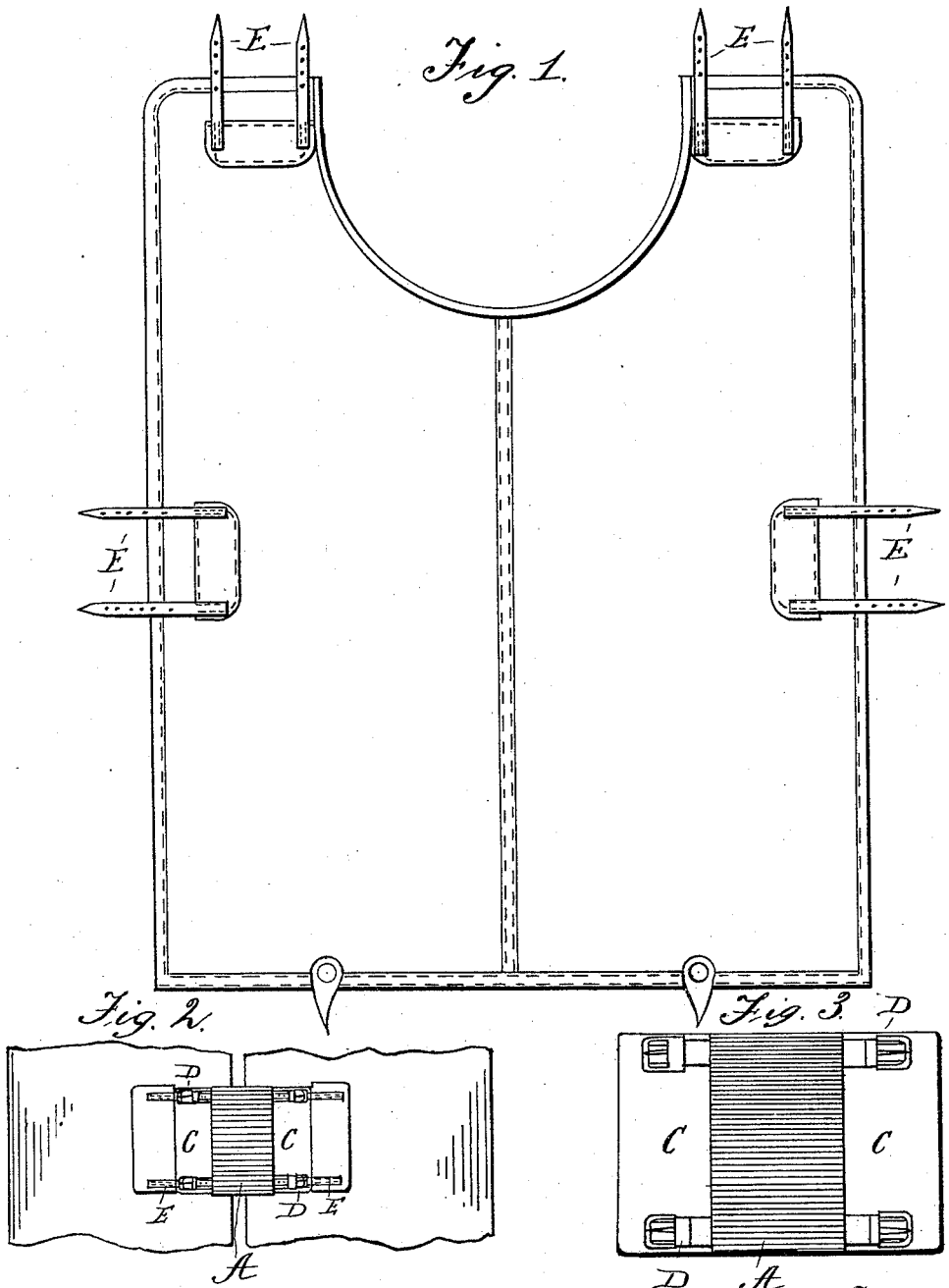

MORRIS T. MARTIN, OF LAKE VILLA, ASSIGNOR TO WILLIAM SHAKEL, OF CHICAGO, ILLINOIS.

FASTENING FOR HORSE-BLANKETS.

SPECIFICATION forming part of Letters Patent No. 461,958, dated October 27, 1891.

Application filed April 1, 1891. Serial No. 387,211. (No model.)

*To all whom it may concern:*

Be it known that I, MORRIS T. MARTIN, residing at Lake Villa, Lake county, State of Illinois, have invented certain new and useful Improvements in Fastenings for Horse-Blankets, of which the following is a specification.

The object of my invention is to provide a fastening which shall be secure and prevent the animal from tearing, removing, or displacing the blanket and which shall be easy and not injurious.

It is well known that the ordinary fastening consisting of a surcingle must, in order to prevent the slipping of the blanket, be drawn so tightly as to often produce discomfort, and when so drawn it frets the animal. In its attempts to remove the source of discomfort the blanket is frequently displaced and torn.

In the accompanying drawings, Figure 1 represents a plan of part of a blanket having the straps secured thereto. Fig. 2 is a plan view representing the attachment secured to the blanket-strap, and Fig. 3 is a plan representing the attachment.

The attachment consists, essentially, of a section A of elastic material, such as rubber webbing or the like. In order to securely attach the same, it is provided at its opposite ends with facings C, of leather or other flexible but unyielding material, and has buckles D D or other fastenings, by which it may be detachably secured to the straps E E or other corresponding attachments secured at the opposite edge of the blanket. The attachment just described furnishes a yielding fastening for the blanket, the pressure being distributed over the surface of the latter, so as not to gall or fret the animal. The fastening, being a fixture upon the blanket, cannot be detached or displaced by any efforts of the animal. Any attempt to pull it off by the teeth or otherwise will simply cause the elastic section A to yield, and upon the release of the blanket it will at once resume its former position, so that it can neither be removed nor torn. The fastening is applicable to both the side and front edge of the blanket and may be placed at one or several points upon said edges.

What I claim as new, and desire to secure by Letters Patent, is—

A horse-blanket fastening consisting of the straps E E, secured to the blanket, and the removable elastic section A, having facings C on each end, and each face carrying buckles for the straps E E, substantiallly as described.

MORRIS T. MARTIN.

Witnesses:
 IRWIN VEEDER,
 TODD MASON.